United States Patent
Iwao et al.

(10) Patent No.: US 8,781,699 B2
(45) Date of Patent: Jul. 15, 2014

(54) COASTING CONTROL DEVICE

(75) Inventors: Nobuyuki Iwao, Fujisawa (JP); Yasushi Yamamoto, Fujisawa (JP); Kazuhiko Kobayashi, Yokohama (JP); Hiroyuki Arai, Yokohama (JP); Kouhei Takama, Yokohama (JP)

(73) Assignees: Isuzu Motors Limited, Tokyo (JP); Transtron Inc., Yokohama-shi (JP)

( * ) Notice: Subject to any disclaimer, the term of this patent is extended or adjusted under 35 U.S.C. 154(b) by 27 days.

(21) Appl. No.: 13/812,927

(22) PCT Filed: Jul. 7, 2011

(86) PCT No.: PCT/JP2011/065563
§ 371 (c)(1),
(2), (4) Date: Jan. 29, 2013

(87) PCT Pub. No.: WO2012/014650
PCT Pub. Date: Feb. 2, 2012

(65) Prior Publication Data
US 2013/0131943 A1   May 23, 2013

(30) Foreign Application Priority Data

Jul. 30, 2010   (JP) .................................. 2010-172554

(51) Int. Cl.
*G06F 7/00* (2006.01)
*G06F 17/00* (2006.01)
*G06F 19/00* (2011.01)

(52) U.S. Cl.
USPC ................. 701/67; 701/1; 192/56.1; 475/269

(58) Field of Classification Search
CPC .......... B60W 10/02; B60W 2710/027; B60W 2710/065; B60W 30/186; B60W 2710/023; B60W 30/1843
USPC ............ 701/1, 67, 68, 99; 192/3.51, 3.54, 31, 192/48.2, 54.1, 56.1; 475/43, 269
See application file for complete search history.

(56) References Cited

U.S. PATENT DOCUMENTS 7,294,091 B2 * 11/2007 Yasui .............................. 477/80
2013/0103275 A1 * 4/2013 Iwao et al. ...................... 701/68

(Continued)

FOREIGN PATENT DOCUMENTS

| JP | 8-67175 | 3/1996 |
| JP | 2001-304305 | 10/2001 |
| JP | 2006-342832 | 12/2006 |

OTHER PUBLICATIONS

Patent Abstracts of Japan, Publication No. 08-067175, Published Mar. 12, 1996.

(Continued)

*Primary Examiner* — Rami Khatib
(74) *Attorney, Agent, or Firm* — Staas & Halsey LLP

(57) ABSTRACT

A coasting control device that prevents failures due to deterioration of a release bearing. The device includes an cumulative disengagement time measuring unit cumulatively measuring a duration of time that a clutch is being disengaged during coasting control, and an overtime restricting unit prohibiting coasting control when the measured cumulative clutch disengagement time has exceeded a predetermined time giving an indication of fatigue of a member of the clutch, and/or an overtime alarm unit providing an alarm when the measured cumulative clutch disengagement time has exceeded a predetermined time giving an indication of fatigue of the member of the clutch.

2 Claims, 5 Drawing Sheets

(56) References Cited

U.S. PATENT DOCUMENTS

2013/0116899 A1* 5/2013 Iwao et al. .................. 701/54
2013/0138313 A1* 5/2013 Iwao et al. .................. 701/67

OTHER PUBLICATIONS

Patent Abstracts of Japan, Publication No. 2001-304305, Published Oct. 31, 2001.
Patent Abstracts of Japan, Publication No. 2006-342832, Published Dec. 21, 2006.
International Search Report of PCT/JP2011/065563 mailed Aug. 9, 2011.
Written Opinion of the International Searching Authority mailed Aug. 9, 2011 in corresponding International Application No. PCT/JP2011/065563.

* cited by examiner

COASTING CONTROL DEVICE

CROSS-REFERENCE TO RELATED APPLICATIONS

This application claims the foreign priority benefit of Japanese Application No. 2010-172554 filed Jul. 30, 2010, the contents of which are incorporated herein by reference, which serves as priority for PCT Application No. JP2011/065563 filed Jul. 7, 2011.

TECHNICAL FIELD

The present invention relates to a coasting control device that disengage a clutch to return an engine to idle to save fuel consumption and to a coasting control device that prevents failures on the road due to deterioration of a release bearing.

BACKGROUND ART

When the accelerator pedal of a vehicle is pressed while the clutch is disengaged, the accelerator (throttle) is opened to cause the engine to run at "idle" and the engine RPM (the number of revolutions of the engine) is stabilized at the engine RPM corresponding to the accelerator opening degree (accelerator position). At that point in time, the driving force generated by the engine and the internal resistance (friction) of the engine are in equilibrium and the engine output torque is 0. That is, the engine does no work for the outside the engine and fuel is wasted. For example, when the engine run at an idle speed of 2000 rpm, the driver hears loud engine noise and therefore can notice that a considerable amount of fuel is being wasted.

The engine does no work for the outside not only during idling caused by disengagement of the clutch as described above but also while the vehicle is in motion. That is, the engine only revolves at an engine RPM corresponding to the accelerator opening degree as in idling and does not contribute to acceleration or deceleration of the vehicle. In this situation, the fuel is consumed only in causing the engine to revolve uselessly, which is highly wasteful.

The present applicant has proposed a coasting control device that performs coasting control (also called fuel-efficient running control) that disengages the clutch and places the engine at idle to save fuel consumption while the engine is running but is doing no work for the outside the engine (Patent Literature 1).

CITATION LIST

Patent Literature

Patent Literature 1: Japanese Patent Laid-Open No. 2006-342832
Patent Literature 2: Japanese Patent Laid-Open No. 8-67175
Patent Literature 3: Japanese Patent Laid-Open No. 2001-304305

SUMMARY OF INVENTION

Technical Problem

In addition to the proposal described above, the present applicant has proposed a coasting control device that uses a coasting control judgment map whose measures are the clutch rotation speed and the accelerator opening degree. The coasting control device disengages the clutch and reduces the engine RPM to start coasting control when a plotted point of the clutch rotation speed and the accelerator opening degree is in a coasting control available region, the accelerator pedal operation speed is in a predetermined range, and the plotted point of the clutch rotation speed and the accelerator opening degree has passed a coasting control threshold line in a direction in which the accelerator opening degree decreases, and ends the coasting control when the accelerator pedal operation speed has gone outside the predetermined range or the plotted point has gone outside the coasting control available region.

Incidentally, the clutch plate of the clutch is pressed against the flywheel of the engine by the force of a spring. To disengage the clutch, the spring is pressed by a release bearing to release the clutch plate from the flywheel. Since the release bearing bears the input shaft of the transmission to which the clutch plate is attached, the release bearing is pressed by a release fork to move the release bearing along the axis when the release bearing is pressed by the spring.

During this clutch disengagement operation, a thrust load is imposed to the release bearing. The thrust load causes deterioration of the release bearing. The release bearing deteriorates in proportion to the duration of time of clutch disengagement. It has been known that resting the foot on the clutch pedal accelerates deterioration of the release bearing.

In coasting control, the clutch is being disengaged for a long duration of time. Whereas the duration of time that the clutch is being disengaged during gear shifting is short, for example, two to three seconds, the duration of time that the clutch is being disengaged during coasting control is as long as 20 to 30 seconds, for example. When coasting control is performed, thrust load is continuously imposed for a longer duration of clutch disengagement than during gear shifting. Accordingly, coasting control inevitably shortens the life of the release bearing. However, it is undesirable that deterioration of the release bearing causes failures on the road.

Therefore an object of the present invention is to provide a coasting control device that solves the problem and prevents failures on the road due to deterioration of a release bearing.

Solution to Problem

To achieve the object, the present invention provides a device including: a coasting control judgment map referred to by a clutch rotation speed and an accelerator opening degree; a coasting control executing unit disengaging a clutch and reducing an engine revolutions per minute to start coasting control when a plotted point of the clutch rotation speed and the accelerator opening degree on the coasting control judgment map is in a coasting control available region, accelerator pedal operation speed is in a predetermined range and the plotted point of the clutch rotation speed and the accelerator opening degree has passed a coasting control threshold line in a direction in which the accelerator opening degree decreases, and ending the coasting control when the accelerator pedal operation speed has gone outside the predetermined range or the plotted point has gone outside the coasting control available region; a cumulative disengagement time measuring unit cumulatively measuring a duration of time that the clutch is being disengaged during coasting control; and an overtime restricting unit prohibiting coasting control when the cumulative clutch disengagement time measured by the cumulative clutch disengagement time measuring unit has exceeded a predetermined time giving an indication of fatigue of a member of the clutch.

The present invention also provides a device including: a coasting control judgment map referred to by a clutch rotation speed and an accelerator opening degree; a coasting control executing unit disengaging a clutch and reducing an engine revolutions per minute to start coasting control when a plotted point of the clutch rotation speed and the accelerator opening degree on the coasting control judgment map is in a coasting control available region, accelerator pedal operation speed is in a predetermined range and the plotted point of the clutch rotation speed and the accelerator opening degree has passed a coasting control threshold line in a direction in which the accelerator opening degree decreases, and ending the coasting control when the accelerator pedal operation speed has gone outside the predetermined range or the plotted point has gone outside the coasting control available region; a cumulative disengagement time measuring unit cumulatively measuring a duration of time that the clutch is being disengaged during coasting control; and an overtime alarming unit providing an alarm when the cumulative clutch disengagement time measured by the cumulative clutch disengagement time measuring unit has exceeded a predetermined time giving an indication of fatigue of a member of the clutch.

Advantageous Effect of Invention

The present invention has the following advantageous effect.

(1) The present invention can prevent failures on the road due to deterioration of a release bearing.

DESCRIPTION OF EMBODIMENT

An embodiment of the present invention will be described with reference to the accompanying drawings.

Figure 1:
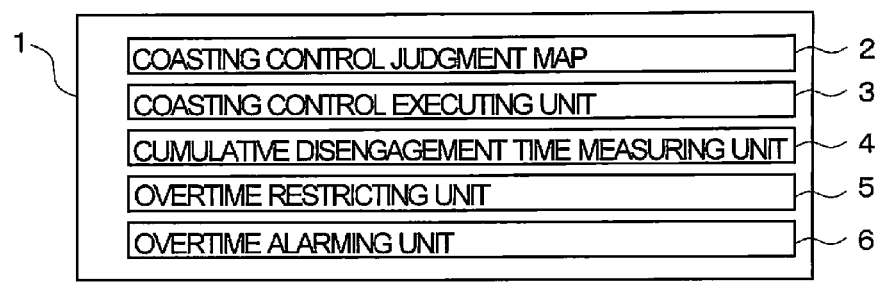
FIG. 1 is a block diagram of a coasting control device of the present invention.

As illustrated in FIG. 1, a coasting control device 1 according to the present invention includes a coasting control judgment map 2 which is referred to by clutch rotation speed and accelerator opening degree, a coasting control executing unit 3 which disengages a clutch and reduces the engine RPM to start coasting control when the plotted point of the clutch rotation speed and the accelerator opening degree on the coasting control judgment map is in a coasting control available region, the accelerator pedal operation speed is in a predetermined range, and the plotted point of the clutch rotation speed and the accelerator opening degree has passed a coasting control threshold line in the direction in which the accelerator opening degree decreases, and ends the coasting control when the accelerator pedal operation speed goes outside the predetermined range or the plotted point goes outside the coasting control available region, an cumulative disengagement time measuring unit 4 which measures a cumulative duration of time that the clutch is being disengaged during coasting control, an overtime restricting unit 5 which prohibits coasting control when the cumulative clutch disengagement time measured by the cumulative disengagement time measuring unit 4 exceeds a predetermined time that gives an indication of fatigue of a member of the clutch, and an overtime alarming unit 6 which provides an alarm when the cumulative clutch disengagement time measured by the cumulative disengagement time measuring unit 4 exceeds the predetermine time that gives an indication of fatigue of a member of the clutch.

Fatigue of a member of the clutch 108 (see FIG. 2) here means fatigue of a release bearing 165 caused primarily by a thrust load imposed over a longer time than that during gear shifting and may include fatigue of other members.

The coasting control judgment map 2, the coasting control executing unit 3, the cumulative disengagement time measuring unit 4, the overtime restricting unit 5 and the overtime alarming unit 6, which make up the coasting control device 1, are preferably installed in an ECU (not depicted), for example.

Components of a vehicle in which the coasting control device 1 is installed will be described.

Figure 2:
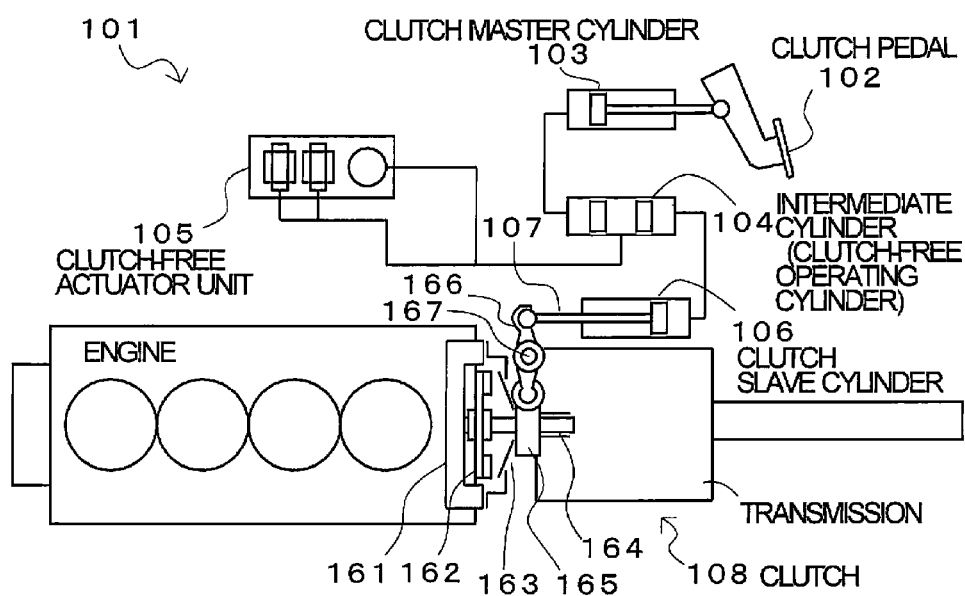
FIG. 2 is a block diagram of a clutch system of a vehicle to which the coasting control device of the present invention is applied.

As illustrated in FIG. 2, a clutch system 101 of a vehicle in which the coasting control device of the present invention is installed is a dual-mode system operating in manual mode and automatic mode controlled by ECU. A clutch master cylinder 103 mechanically coupled to a clutch pedal 102 is configured to supply hydraulic oil to an intermediate cylinder (also called clutch-free operating cylinder or switching cylinder) 104 according to a press/release operation of the clutch pedal 102 by a driver. On the other hand, a clutch-free actuator unit 105 controlled by the ECU (not depicted) is configured to supply hydraulic oil to the intermediate cylinder 14 in accordance with an instruction to disengage/engage the clutch. The intermediate cylinder 104 is configured to supply hydraulic oil to a clutch slave cylinder 106. A piston 107 of the clutch slave cylinder 106 is mechanically coupled to a movable part of the clutch 108.

The clutch 108 includes a clutch plate 162 which faces a flywheel 161 of the engine, a spring 163 which presses the clutch plate 162 against the flywheel 161, a release bearing 165 which moves along an input shaft 164 to release the clutch plate 162 from the flywheel 161, and a release fork 166 which is driven by the piston 107 to move the release bearing 165. The spring 163 is conical in shape. The outer periphery of the spring 163 is in contact with the clutch plate 162 and the inner periphery of the spring 163 is in contact with the release bearing 165. The release bearing 165 is configured to bear the input shaft 164 of the transmission and to be movable in the axis direction along the input shaft 164. The release fork 166 is a lever. One end of the length of the release fork 166 is coupled to the piston 107, the other end is coupled to the release bearing 165, and a fulcrum 167 is provided between the two ends.

When the clutch slave cylinder 106 in the clutch 108 having the configuration illustrated in FIG. 2 is filled with hydraulic oil to extend the rod of the piston 107, the release fork 166 rotates to move the release bearing 165 in a direction away from the spring 163. Accordingly, the force of the spring 163 pressing the clutch plate 162 is lost and the clutch plate 162 moves away from the flywheel 161 to prevent rotation from being transmitted from the flywheel 61 to the clutch plate 162. That is, the clutch is disengaged.

On the other hand, when hydraulic oil is ejected from the clutch slave cylinder 106 to retract the rod of the piston 107, the release fork 166 rotates in the direction opposite to the direction described above to move the release bearing 165 in the direction in which the release bearing 165 is pressed against the spring 163. Accordingly, the pressing force of the spring 163 works on the clutch plate 162 and the clutch plate 162 is pressed against the flywheel 161 to allow rotation to be transmitted from the flywheel 161 to the clutch plate 162. That is, the clutch is engaged.

The clutch 108 may be configured differently from the clutch 108 in FIG. 2 so that when the release bearing 165 presses the spring 163, the outer periphery of the spring 163 rotates to disengage the clutch. In this case, the clutch slave cylinder 106 is oppositely oriented so that the piston 107 extends in the direction opposite to the direction in FIG. 2 (see FIGS. 3 and 4). Thus, the operation logic of the actuator will be the same irrespective of the configuration of the clutch 108.

Figure 3:
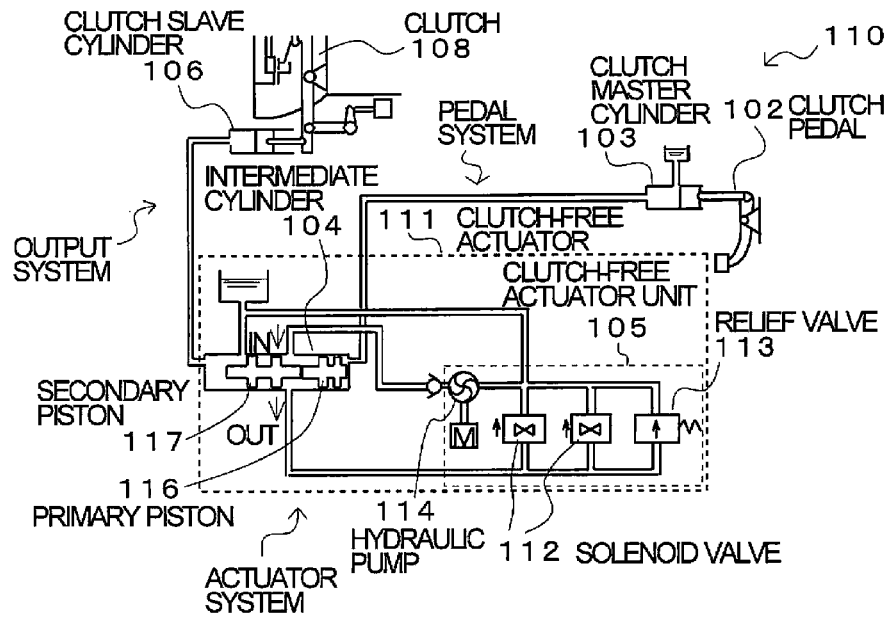
FIG. 3 is a diagram illustrating a configuration of an actuator implementing the clutch system in FIG. 2.

As illustrated in FIG. 3, an actuator 110 includes a clutch-free actuator 111. The clutch-free actuator 111 includes an intermediate cylinder 104 and a clutch-free actuator unit 105. The clutch-free actuator unit 105 includes a solenoid valve 112, a relief valve 113, and a hydraulic pump 114. The intermediate cylinder 104 includes a primary piston 116 and a secondary piston 117 arranged in series and is configured so that when hydraulic oil from the clutch master cylinder 103 causes the primary piston 116 to stroke, the secondary piston 117 strokes along with the primary piston 116. The intermediate cylinder 104 is configured so that hydraulic oil from the clutch-free actuator unit 105 causes the secondary piston 117 to stroke. Hydraulic oil is supplied to the clutch slave cylinder 106 in response to the stroke of the secondary piston 117. In this configuration, when a manual operation is performed, the clutch is disengaged or engaged according to the manual operation in preference; when the manual operation is not being performed, the clutch is disengaged or engaged according to control of the ECU.

Note that the coasting control device of the present invention is also applicable to an automatic clutch system that does not have manual mode.

Figure 4:
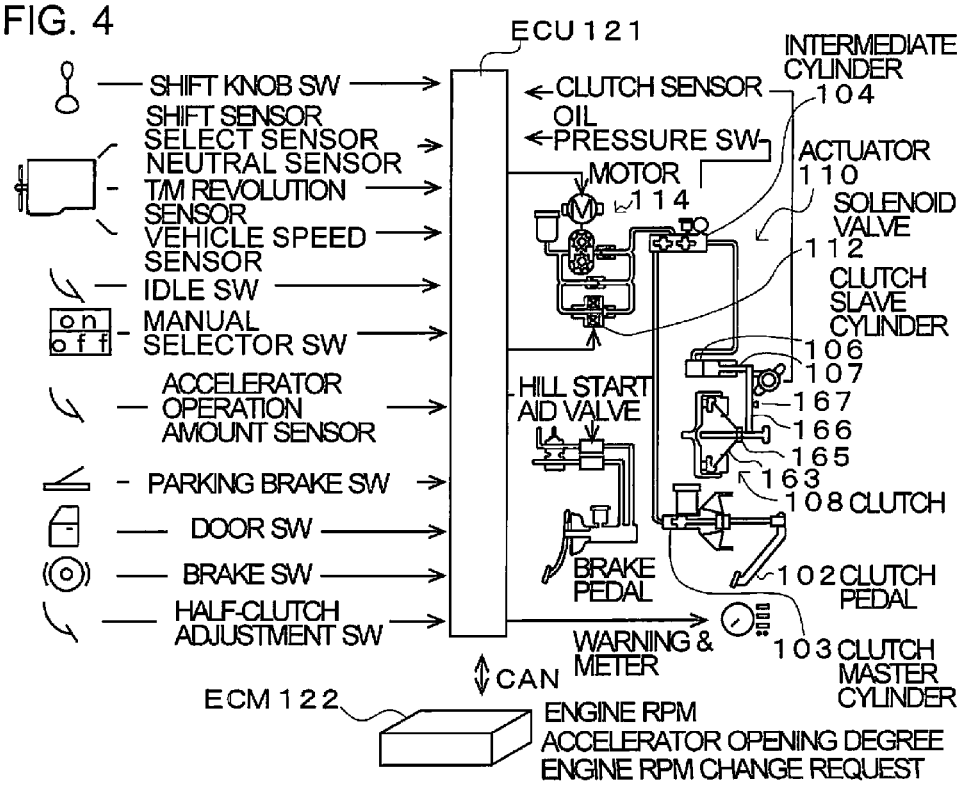
FIG. 4 is an input and output configuration diagram of a vehicle to which the coasting control device of the present invention is applied.

As illustrated in FIG. 4, an ECU 121, which controls primarily the transmission and clutch, and an ECM 122, which controls primarily the engine are provided in the vehicle. Connected to the ECU 121 are the input signal lines for a shift knob switch, a transmission shift sensor, a select sensor, a neutral switch, a T/M revolution sensor, a vehicle speed sensor, an idle switch, a manual selector switch, a parking brake switch, a door switch, a brake switch, a half-clutch adjustment switch, an accelerator operation amount sensor, a clutch sensor, and an oil pressure switch. Output signal lines for a motor for a hydraulic pump 114, a solenoid valve 112, a hill start aid valve, a warning and meter of a clutch system 101 are also connected to the ECU 121. Various input signal lines and output signal lines, not depicted, used for engine control are connected to the ECM 122. The ECM 122 is capable of sending engine RPM, accelerator opening degree, and engine RPM change request signals to the electronic control unit 121 through CAN (Controller Area Network) transmission lines.

The clutch rotation speed used in the present invention is the rotation speed on the driven side of the clutch, which is equal to the rotation speed of the input shaft of the transmission. The clutch rotation speed can be determined from the rotation speed of the input shaft detected by an input shaft rotation speed sensor, not depicted. Alternatively, the clutch rotation speed can be determined using the gear ratio of the current gear from the speed of the vehicle detected by a vehicle speed sensor. The clutch rotation speed represents the engine RPM which is equivalent to the speed of the vehicle.

An operation of the coasting control device 1 of the present invention will be described below.

Figure 5:
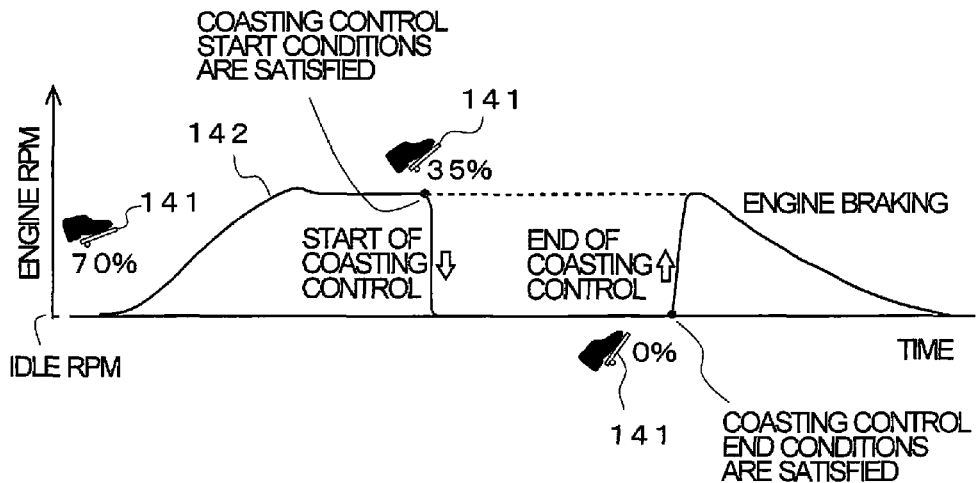
FIG. 5 is a conceptual operation diagram illustrating an overview of coasting control.

The concept of operation of coasting control will be described with reference to FIG. 5. It is assumed here that the target engine RPM during coasting control is equal to the idle RPM. The horizontal axis represents time and a control flow and the vertical axis represents engine RPM. When the accelerator pedal 141 is pressed down at the idle revolution and the accelerator opening degree is kept at 70%, the engine RPM 142 increases to accelerate the vehicle. When the engine RPM 142 is stabilized and the press of the accelerator pedal 141 is decreased to an accelerator opening degree of 35%, coasting control start conditions, which will be described later, are considered to be satisfied. When coasting control is started, the clutch is disengaged and the engine RPM 142 is controlled to the idle RPM. The vehicle runs under coasting control. Then the accelerator pedal is released and the accelerator opening degree becomes 0% or other coasting control end conditions for terminating coasting control are satisfied. Upon termination of the coasting control, the engine revolution is controlled and the clutch is engaged. Since the accelerator opening degree is 0% in this example, an engine braking state is entered to decelerate the vehicle.

If coasting control were not performed, the engine would be maintained at a high RPM as indicated by the dashed line during the coasting control and fuel would be wasted accordingly. Coasting control reduces the engine RPM 142 to the idle RPM, thereby saving fuel.

Figure 6:
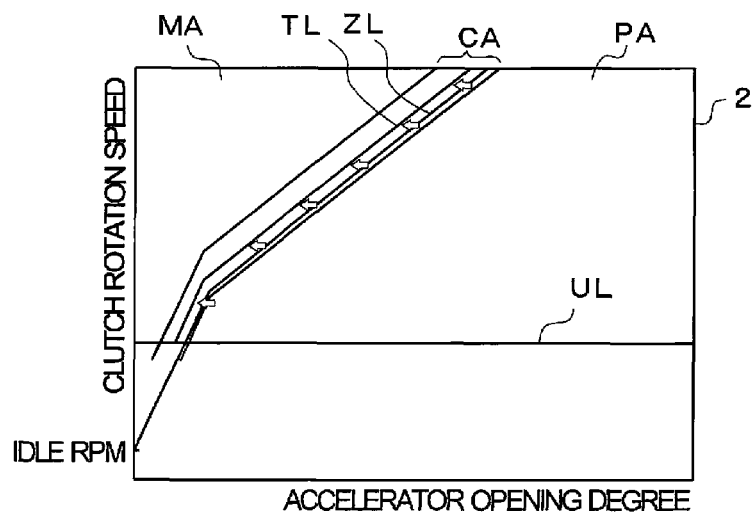
FIG. 6 is a graph image diagram of a coasting control judgment map.

FIG. 6 shows a graph image of a coasting control judgment map 2.

The coasting control judgment map 2 is a map with the horizontal axis representing the accelerator opening degree and the vertical axis representing the clutch rotation speed. The coasting control judgment map 2 can be divided into two regions: a negative region MA where the engine output torque is negative and a positive region PA where the engine output torque is positive. The negative region MA is a region where the engine output torque is negative because the friction of the engine is greater than a demanded engine torque. The positive region PA is a region where the engine output torque is positive because the demanded engine torque is greater than the friction of the engine. The engine output torque zero line ZL which is the boundary between the negative region MA and the positive region PA represents a state in which the engine is doing no work for the outside the engine and fuel is being wasted, as described in the Background Art section.

In the present embodiment, the coasting control threshold line TL is set slightly to the left of the engine output torque zero line ZL (on the side where the accelerator opening degree is small) on the coasting control judgment map 2. A coasting control available region CA having a finite width including the coasting control threshold line TL is set between the negative region MA and the position region PA on the coasting control judgment map 2. A clutch rotation speed lower threshold line UL is set on the coasting control judgment map 2. The lower threshold line UL defines the lower threshold value of the clutch rotation speed independently of the accelerator opening degree. As illustrated, the lower threshold line UL is set slightly above the clutch rotation speed at idle.

The coasting control device 1 starts coasting control when all of the following four coasting start conditions are satisfied.

(1) The speed of operation of the accelerator pedal is within the thresholds.

(2) The plotted point of the clutch rotation speed and the accelerator opening degree on the coasting control judgment map 2 has passed the coasting control threshold line TL in the direction of releasing the accelerator pedal.

(3) The point plotted on the coasting control judgment map 2 is in the coasting control available region CA.

(4) The clutch rotation speed is above or on the lower threshold line UL on the coasting control judgment map 2.

The coasting control device 1 ends coasting control when at least one of the following two coasting control end conditions is satisfied.

(1) The speed of operation of the accelerator pedal is beyond the thresholds.

(2) Points plotted on the coasting control judgment map 2 are outside the coasting control available region CA.

An operation of the coasting control device according to the coasting control judgment map 2, the coasting start conditions, and the coasting end conditions will be described.

The coasting control executing unit 3 constantly monitors the accelerator opening degree based on the amount of accelerator pedal operation and the clutch rotation speed determined from the input shaft rotation speed or the vehicle speed and plots a coordinate point of the accelerator opening degree and the clutch rotation speed on the coasting control judgment map 2 in FIG. 6. The coordinate point moves with time. When the coordinate point is within the coasting control available region CA, the coasting control executing unit 3 determines whether or not coasting control is to be started. When the coordinate point is not within the coasting control available region CA, the coasting control executing unit 3 does not make determination as to whether coasting control is to be started or not.

When subsequently the coordinate point has passed the coasting control threshold line TL in the direction in which the accelerator opening degree decreases, the coasting control executing unit 3 starts coasting control. Specifically, the coasting control device 1 performs control to disengage the clutch and controls a control accelerator opening degree that the ECM 122 indicates to the engine to a degree equivalent to an idle RPM. As a result, the clutch is disengaged and the engine is forced to idle.

As indicated by the arrows in FIG. 6, the coordinate point moves leftward in FIG. 6 as the accelerator opening degree decreases. If the coordinate point has passed the coasting control threshold line TL but the direction in which the coordinate point has moved has a component moving rightward in the figure, the accelerator opening degree increases and therefore the coasting control executing unit 3 does not start coasting control.

The coasting control executing unit 3 continues constantly monitoring the accelerator opening degree and the clutch rotation speed and plotting the coordinate point of the accelerator opening degree and the clutch rotation speed on the coasting control judgment map 2 after the coasting control has been started. When the coordinate point has gone outside the coasting control available region CA, the coasting control executing unit 3 ends the coasting control.

The operation described above prevents coasting control from being started even if the coordinate point of the accelerator opening degree and the clutch rotation speed passes the coasting control threshold line TL while the accelerator pedal is being operated toward the press-down side. Coasting control is started only when the coordinate point has passed the coasting control threshold line TL while the accelerator pedal is being operated toward the release side. Accordingly, the driver does not experience uneasiness.

When the coordinate point is below the lower threshold line UL (when the clutch rotation speed is lower than the lower threshold value), the coasting control executing unit 3 does not start coasting control. This is because disengaging the clutch while the engine is at idle does not significantly save fuel consumption. Therefore, the coasting control executing unit 3 starts coasting control only when the coordinate point is above the lower threshold line UL.

Figure 7:
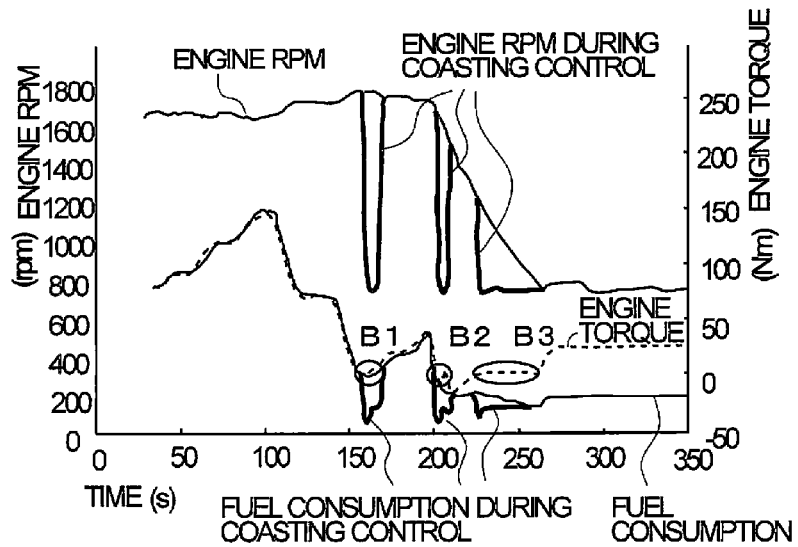
FIG. 7 is a graph illustrating a fuel saving effect of the coasting control.

The fuel saving effect of the coasting control will be described with reference to FIG. 7.

It is assumed first that coasting control is not performed. The engine RPM is varying in the range from 1600 to 1700 rpm in the period from approximately 30 s to approximately 200 s and is decreasing from approximately 1700 rpm to approximately 700 rpm (idle RPM) in the period from approximately 200 s to approximately 260 s.

The engine torque is increasing in the period from approximately 30 s to approximately 100 s, then decreasing until approximately 150 s. The engine torque is approximately 0 Nm in the period from approximately 150 s to approximately 160 s and is increasing in the period from approximately 160 s to approximately 200 s, but decreases to approximately 0 Nm at approximately 200 s. Consequently, there are three periods in which the engine torque is approximately 0 Nm: the period from approximately 150 s to approximately 160 s (ellipse B1), the period from approximately 200 s to approximately 210 s (ellipse B2) and the period from approximately 220 s to approximately 260 s (ellipse B3).

The fuel consumption (which is not marked on the vertical axis but is marked over the engine torque for convenience) changes substantially according to change in the engine torque in the period from approximately 50 s to approximately 200 s. The fuel consumption is not 0 even when the engine torque is approximately 0 Nm.

It is assumed that coasting control is performed here. The engine RPM is controlled by the idle RPM in the period in which the engine torque is approximately 0 Nm. In the graph, the line (thick solid line) that branches from the line (solid line) representing the engine RPM when not performing coasting control represents the engine RPM (bold solid line) during coasting control. The coasting control was performed three times in the periods in ellipses B1, B2 and B3. The fuel consumptions in the periods in which coasting control was being performed is lower than the fuel consumption when coasting control was not performed, showing that fuel was saved.

A specific example of settings of the coasting control judgment map 2 will be described next.

Figure 8:
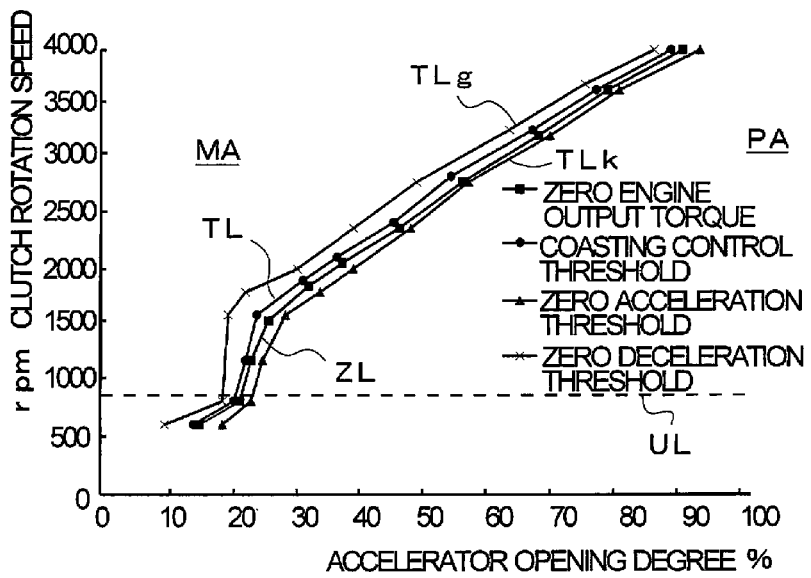
FIG. 8 is a graph of accelerator opening degree versus clutch rotation speed actually measured for making the coasting control judgment map.

As illustrated in FIG. 8, characteristics of the accelerator opening degree and the clutch rotation speed are actually measured to plot a graph with the horizontal axis representing accelerator opening degree and the vertical axis representing clutch rotation speed (=engine RPM during clutch engagement) in order to make a coasting control judgment map 2. In this way a measured engine output torque zero line ZL can be drawn. The entire region to the left of the engine output torque zero line ZL is the negative region MA and the entire region to the right to ZL is the positive region PA.

A coasting control threshold line TL is defined and drawn slightly to the left of the engine output torque zero line ZL. A zero deceleration threshold line TLg is estimated and drawn slightly to the left of the coasting control threshold line TL. A zero acceleration threshold line TLk is estimated and drawn slightly to the right of the engine output torque zero line ZL. The region between the zero deceleration threshold line TLg and the zero acceleration threshold line TLk is defined as a coasting control available region CA. The lower threshold line UL is set at 880 rpm in this example.

The zero deceleration threshold line TLg and the zero acceleration threshold line TLk are set in such a way that the drivability for the driver is not impaired. Since the drivability depends on human feeling and cannot be digitized in design, the zero deceleration threshold line TLg and the zero acceleration threshold line TLk are tuned using a real vehicle. The coasting control threshold line TL is set at the midpoint between the zero deceleration threshold line TLg and the zero acceleration threshold line TLk.

The graph in FIG. 8 thus plotted is digitized (discretized) as appropriate and is stored in a memory to provide a coasting control judgment map 2 that can be used by the coasting control executing unit 3 for its computing operations.

A procedure of a protective operation for a clutch member (hereinafter referred to as the release bearing 165) based on cumulative clutch disengagement time in the coasting control device 1 of the present invention will be described next with reference to FIGS. 9, 10 and 11.

It is assumed here that a cumulative clutch disengagement time Tc set in the coasting control device 1 is externally reset (cleared to zero) at the time of manufacture or delivery of the vehicle and at the time of replacement of the release bearing 165. When subsequently the coasting start conditions are satisfied, the coasting control device 1 starts coasting control; when the coasting control end conditions are satisfied, the coating control device 1 ends the coasting control. The coasting control device 1 repeats this sequence.

Figure 9:
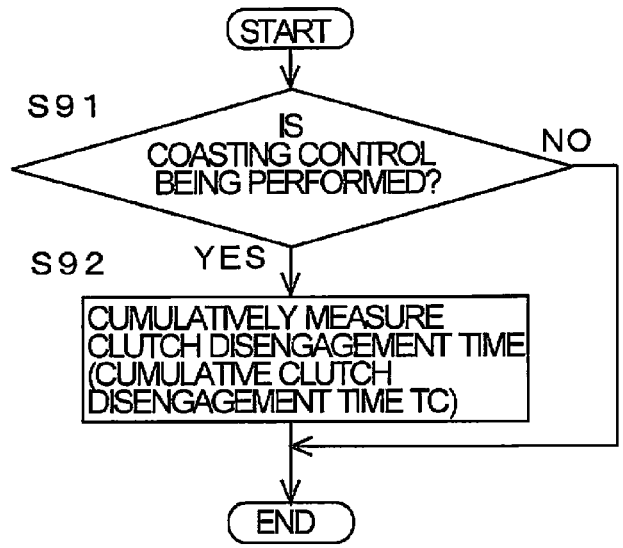
FIG. 9 is a flowchart illustrating a procedure of cumulative clutch disengagement time measurement in the coasting control device of the present invention.

As illustrated in FIG. 9, the cumulative disengagement time measuring unit 4 determines at step S91 whether or not coasting control is being performed. If NO, the procedure proceeds to END. If YES, the cumulative disengagement time measuring unit 4 cumulatively measures the duration of the time that the clutch is being disengaged at step S92. In this way, the cumulative clutch disengagement time Tc is counted up during clutch control whereas the cumulative clutch disengagement time Tc is maintained at the same value while coasting control is not being performed.

Figure 10:
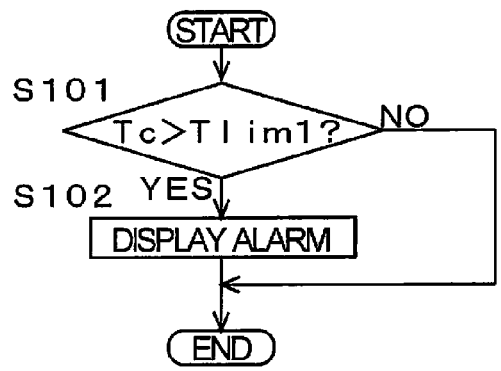
FIG. 10 is a flowchart illustrating a procedure of issuance of an overtime alarm in the coasting control device of the present invention.

As illustrated in FIG. 10, the overtime alarming unit 6 determines at step S101 whether or not the cumulative clutch disengagement time Tc has exceeded a predetermined time Tlim1. Preferably, fatigue of a release bearing 165 is studied beforehand by experiment and an appropriate time at which an alarm is to be provided is set as Tlim1. If NO, the procedure proceeds to END. If YES, the procedure proceeds to step S102, where an alarm is provided. The purpose of the alarm is to prompt the driver to do maintenance (replacement) of the release bearing 165 and an appropriate visual means is used for alarm.

Figure 11:
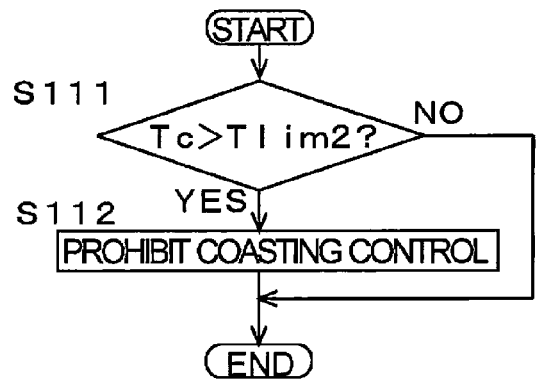
FIG. 11 is a flowchart of a procedure of restricting overtime in the coasting control device of the present invention.

As illustrated in FIG. 11, the overtime restricting unit 5 determines at step S111 whether or not the cumulative clutch disengagement time Tc has exceeded a predetermined time Tlim2. Preferably, fatigue of a release bearing 165 is studied beforehand by experiment and an amount of time beyond which a lengthy clutch engagement such as that in coasting control is to be prohibited is set Tlim2. If No, the procedure proceeds to END. If YES, the procedure proceeds to step S112 to prohibit coasting control.

As has been described above, the coasting control device 1 of the present invention is configured so that the cumulative clutch disengagement time Tc is measured and, when the cumulative clutch disengagement time Tc has exceeded the predetermined time Tlim2, coasting control is prohibited. Consequently, failures on the road due to deterioration of the release bearing are prevented.

The coasting control device 1 of the present invention is configured so that the cumulative clutch disengagement time Tc is measured and, when the cumulative clutch disengagement time Tc has exceed a predetermined time Tlim1, an alarm is provided. Consequently, maintenance can be done at an appropriate time and therefore failures on the road due to deterioration of the release bearing are prevented.

Both of the predetermined time Tlim1 used for providing the alarm and the predetermined time Tlim2 used for prohibiting coasting control, which give an indication of fatigue of the release bearing 165, may be equal to each other so that the display of the alarm and prohibition of coasting control are performed at the same time. In that case, the release bearing 165 can continue to be used until coasting control is prohibited. Alternatively, Tlim1 may be smaller than Tlim2. In that case, the driver can replace the release bearing 165 before the coasting control is prohibited.

REFERENCE SIGNS LIST

1 Coasting control device
2 Coasting control judgment map
3 Coasting control executing unit
4 Cumulative disengagement time measuring unit
5 Overtime restricting unit
6 Overtime alarming unit

The invention claimed is:

1. A coasting control device comprising:
a coasting control judgment map referred to by a clutch rotation speed and an accelerator opening degree;
a coasting control executing unit disengaging a clutch and reducing an engine revolutions per minute to start coasting control when a plotted point of the clutch rotation speed and the accelerator opening degree on the coasting control judgment map is in a coasting control available region, accelerator pedal operation speed is in a predetermined range and the plotted point of the clutch rotation speed and the accelerator opening degree has passed a coasting control threshold line in a direction in which the accelerator opening degree decreases, and ending the coasting control when the accelerator pedal operation speed has gone outside the predetermined range or the plotted point has gone outside the coasting control available region;
a cumulative disengagement time measuring unit cumulatively measuring a duration of time that the clutch is being disengaged during coasting control; and
an overtime restricting unit prohibiting coasting control when the cumulative clutch disengagement time measured by the cumulative clutch disengagement time measuring unit has exceeded a predetermined time giving an indication of fatigue of a member of the clutch.

2. A coasting control device comprising:
a coasting control judgment map referred to by a clutch rotation speed and an accelerator opening degree;
a coasting control executing unit disengaging a clutch and reducing an engine revolutions per minute to start coasting control when a plotted point of the clutch rotation speed and the accelerator opening degree on the coasting control judgment map is in a coasting control available region, accelerator pedal operation speed is in a predetermined range and the plotted point of the clutch rotation speed and the accelerator opening degree has passed a coasting control threshold line in a direction in which the accelerator opening degree decreases, and ending the coasting control when the accelerator pedal operation speed has gone outside the predetermined range or the plotted point has gone outside the coasting control available region;

a cumulative disengagement time measuring unit cumulatively measuring a duration of time that the clutch is being disengaged during coasting control; and an overtime alarming unit providing an alarm when the cumulative clutch disengagement time measured by the cumulative clutch disengagement time measuring unit has exceeded a predetermined time giving an indication of fatigue of a member of the clutch.

* * * * *